Aug. 25, 1942.  C. H. GRAESSER ET AL  2,294,175
DIAL INSTRUMENT CASE
Original Filed Aug. 14, 1940   2 Sheets-Sheet 1
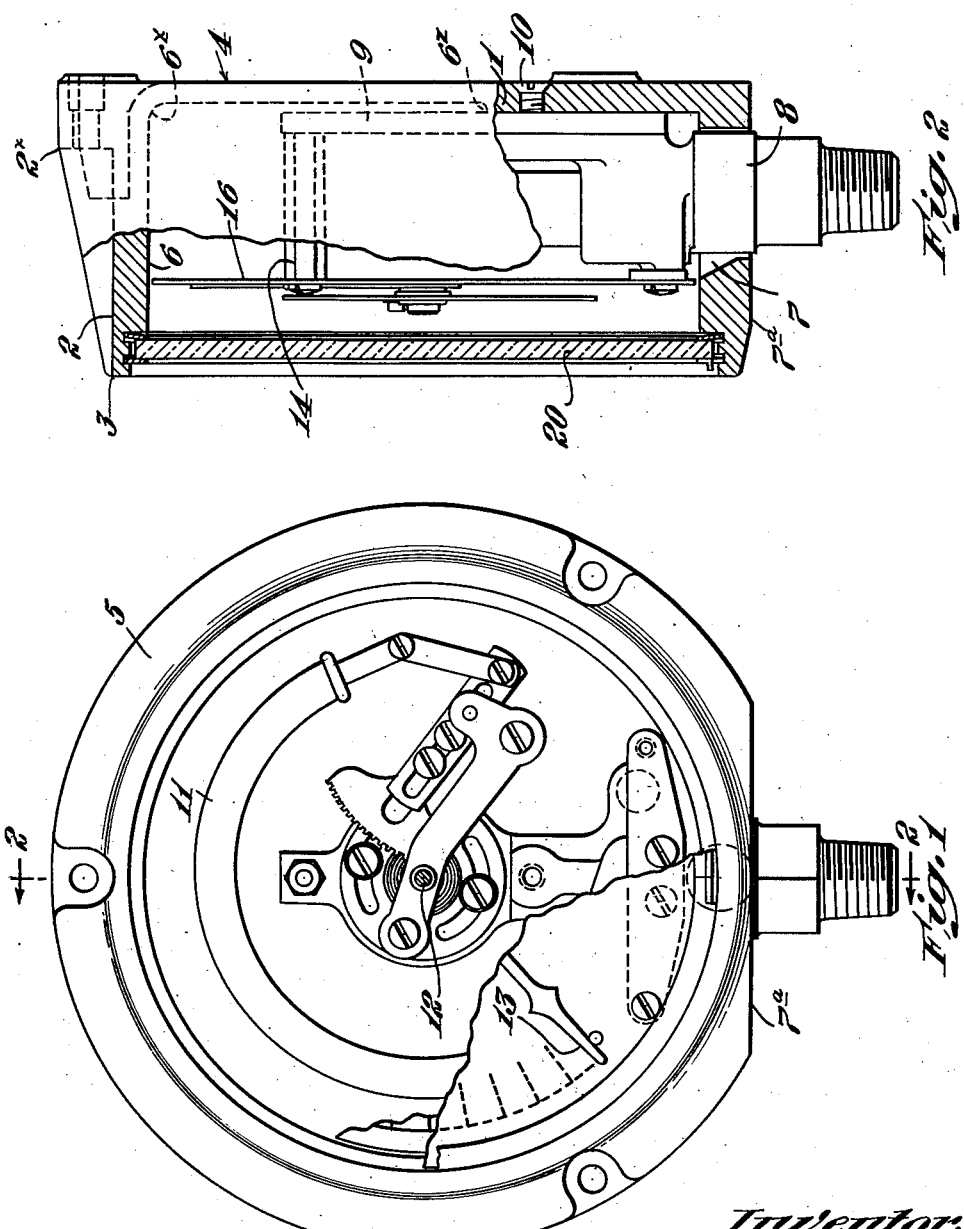
Inventors
Carl H. Graesser
Frank H. Hopkins
by Roberts Cushman Woodberry
Att'ys.

Aug. 25, 1942.    C. H. GRAESSER ET AL    2,294,175
DIAL INSTRUMENT CASE
Original Filed Aug. 14, 1940    2 Sheets-Sheet 2
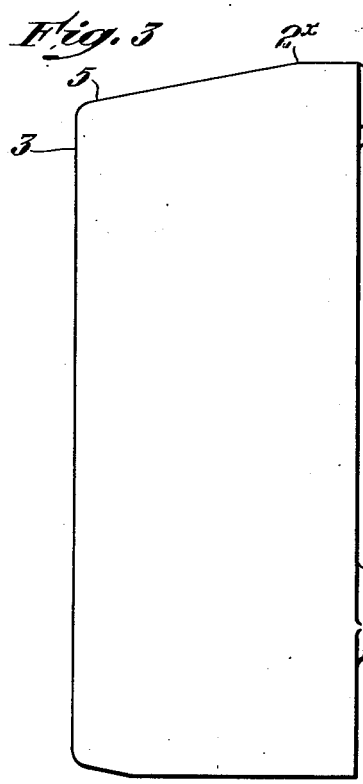
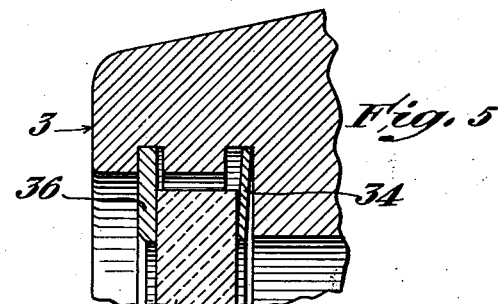
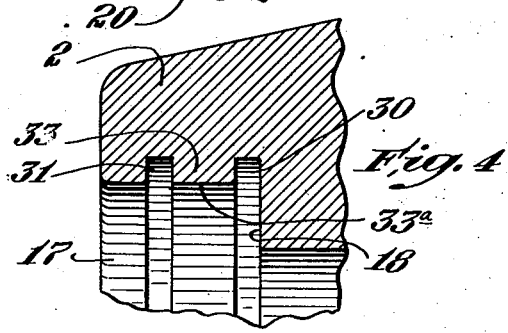
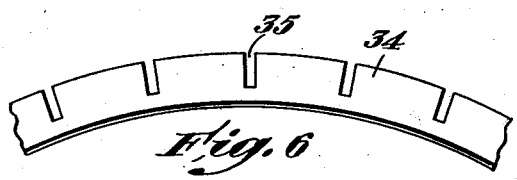
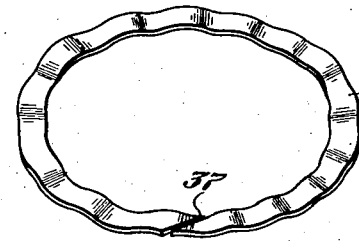
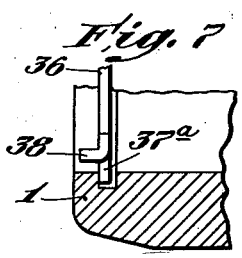
Inventors
Carl H. Graesser
Frank H. Hopkins Patented Aug. 25, 1942

2,294,175

UNITED STATES PATENT OFFICE 2,294,175

DIAL INSTRUMENT CASE

Carl H. Graesser, Bridgeport, and Frank H. Hopkins, Fairfield, Conn., assignors to Manning, Maxwell & Moore, Incorporated, New York, N. Y., a corporation of New Jersey Original application August 14, 1940, Serial No. 352,538. Divided and this application May 9, 1941, Serial No. 392,638

8 Claims. (Cl. 73—151)

This invention relates to pressure gauges, dial thermometers, or instruments of generally similar construction wherein a pointer or index is moved over a graduated dial by mechanism housed within a protective casing, the latter having a removable transparent front panel, and relates more especially to a novel form of case for such instruments, this application being a division of copending application Serial No. 352,538, filed August 14, 1940.

In accordance with usual prior practice the gauge case is a substantially cylindrical metal box, usually having a thin, integral, radial attaching flange at its rear end and having screw threads at its forward end for engagement by screw threads formed upon an annulus designed to be removably secured by such screw threads to the case proper, and which constitutes a portion of the closure cap which covers and protects the dial and pointer. Usually, the cap includes a transparent panel of glass or the like fixed within the annulus by means of a screw-threaded ring which fits within the annulus and presses the glass firmly against a radial shoulder of the annulus. To provide this shoulder and to furnish a good bearing for the glass, the annulus usually has a radial flange of substantial width whose inner edge defines the sight opening through which the dial may be viewed. Since this flange is of substantial width, for example three-eighths of an inch or more, the sight opening is of substantially less diameter than the interior of the case and thus, even though the dial be of the maximum diameter which will fit within the case, the effective area of the dial is very substantially reduced by the flange of the cap.

As noted, gauge cases have customarily been made of metal, for instance steel or brass, but some of the more recently developed plastic materials, for instance some of the synthetic resins, have properties (for instance, ease of moulding to exact shape, lightness of weight, resistance to corrosion, fine appearance, etc.) which recommend them for use in making gauge cases. However, such materials are not as strong as metal and if moulded to the same dimensions as the usual metal case, the attaching flange and cap annulus would not be strong enough to withstand the stresses of use. Thus, heretofore, in designing gauge cases to be made from such material, it has been thought necessary to make certain parts at least of the case, for example the attaching flange and the cap annulus, of substantially greater dimensions than when these parts are made of metal. However, this imparts a clumsy appearance to the gauge, requires an abnormal amount of a relatively expensive material, and, as respects the cap annulus, requires the radial flange to be of even greater depth than usual, thus cutting off still more of the effective area of the dial.

The closure cap is usually designed for removal from the case to facilitate inspection or recalibration of the gauge mechanism. However, when the case and the bezel which holds the transparent panel are both of metal, they are subject to corrosion or rusting so that removal may become difficult or impossible; if the case and the bezel portion of the cap are both moulded from non-metallic material, it is difficult so to mould them as to provide proper tolerances or to prevent subsequent plastic flow of the material, thus making it difficult to assemble the parts or to separate them.

Principal objects of the present invention are to provide a gauge case of such shape and construction that substantially the entire dial is exposed to view, and to provide a gauge case which may be made, for example, from one of the plastic non-metals but having provision for reliably but removably securing the transparent front panel in place without unduly adding to the complexity of construction or decreasing the size of the sight opening.

Other and further objects and advantages of the invention will be pointed out hereinafter in the following more detailed description and by reference to the accompanying drawings, wherein Fig. 1 is a front elevation of a pressure gauge embodying certain features of the present invention, a portion of the transparent front panel being broken away;

Fig. 2 is a vertical section substantially on the line 2—2 of Fig. 1;

Fig. 3 is a side elevation of the case;

Fig. 4 is a fragmentary section on substantially the same plane as Fig. 2 but to much larger scale, showing the forward portion of the gauge case;

Fig. 5 is a view similar to Fig. 4 but showing the transparent panel in place;

Fig. 6 is a fragmentary front view of the compression ring used in positioning the transparent panel;

Fig. 7 is a fragmentary section, substantially on the same plane as Fig. 2, but to larger scale, showing details of the split, panel retaining ring at the point where its ends abut;

Fig. 8 is a fragmentary front elevation of the parts shown in Fig. 7; and

Fig. 9 is a perspective view illustrating a compression ring of a modified and preferred form.

The gauge case disclosed in the drawings is designed to be molded as an integral unitary structure from a suitable plastic material, for example one of the synthetic resins, a cellulose derivative or a rubber compound, and is shown as comprising the rear wall 1 and the side wall 2. The case, as here illustrated, is of generally circular contour in front elevation, although it is to be understood that the invention is not limited to a case of this particular contour.

As shown in Fig. 2, the case increases in diameter from its front edge 3 to a point spaced a short distance forward of its rear face 4 so that the external surface 5 of the forward, main part of the case is substantially that of a truncated cone, the exterior surface 5 flaring rearwardly from the front edge 3 and being substantially smooth and devoid of any appreciable projections or other protuberances. The rear portion of the case, between the point 2x and the rear face 4 is substantially cylindrical.

As here illustrated the inner surface 6 of the side wall of the case is of substantially cylindrical contour, being of approximately the same diameter throughout the main part of the case and thus providing a substantially cylindrical chamber for the reception of the operating mechanism. As here illustrated, the lower part of the wall of the case is furnished with an aperture 7 to accommodate the socket 8 by means of which the gauge is connected to the pressure supply pipe. Obviously, the socket may be arranged to enter an opening in the rear wall 1, instead of the side wall, in accordance with the usual practice. As illustrated herein, the lower part of the case in which the aperture 7 is formed is flattened or slabbed off as shown at 7a, but this is not an essential or necessary feature.

The movement frame 9 is secured within the case by means of screws 10 and supports the Bourdon tube 11 which, in the usual manner, by means of gauge movement mechanism, operates the index or pointer staff 12, upon the forward end of which is mounted the index or pointer 13. The movement frame also comprises posts 14 designed to support the graduated dial 16 in a plane substantially parallel to the plane of the front edge 3 of the case. The dial is thus supported independently of the case so that distortion or displacement of the case does not affect the position of the dial. The cylindrical inner surface 6 of the side wall of the case preferably merges with a smooth curve at 6x with the interior surface of the rear wall of the case, such rear wall preferably having a forward offset 6z to which the movement frame is secured, by the screws 10, the offset providing clearance between the upper portion of the frame and the rear wall of the case.

The inner surface of the forward part of the side wall 2 of the case is furnished with a circumferential recess or rabbet 17 (Fig. 4), having a substantially vertical or radial rear wall 18 whose outer part also forms the rear wall of a circumferential groove 30. Spaced forwardly from the groove 30 is a second circumferential groove 31 whose front wall is substantially radial or vertical. The grooves 30 and 31 are separated by a portion 33 of the side wall 2 of the case whose inner peripheral surface 33a is substantially cylindrical, and whose front-to-rear length is preferably slightly less than the thickness of any glass or other transparent panel which may be used in the front of the gauge.

Within the groove 30 is arranged a compression ring 34 (Fig. 5). This ring is made of resilient material, for example spring steel or spring brass; is preferably provided with circumferentially spaced radial slots 35 (Fig. 6) to increase its resiliency in a radial direction; and is dished so that its inner margin tends to lie in a plane forwardly of that of its outer margin. This ring is of an outer diameter substantially greater than the diameter of the surface 33, but by reason of its resiliency may be twisted sufficiently to snap it into the groove 30, where it may remain during the life of the gauge.

Fig. 9 illustrates another and preferred form of compression ring. This ring 34a is made of resilient metal ribbon bent edgewise to circular form and having beveled ends which abut at 37. This ring is crimped or waved transversely so that when seated in groove 30 it exerts resilient pressure against the panel 20 at spaced points.

A retaining ring 36 is normally arranged within the groove 31. This ring 36 is not necessarily as resilient as the ring 34, and as shown in Fig. 5 is substantially thicker than the ring 34, but is split at the point 37a (Fig. 8) so that its ends at the split may be slid by each other, thereby to decrease its external diameter sufficiently to enable it to be disposed in the groove 31. Preferably the outer diameter of the ring 36 is slightly greater than the outer diameter of the groove 31 so that in order to abut the ends of the ring 36 after it has been put in place, it is necessary to impart substantial tension to the ring, thus tending to buckle it slightly out of a plane. Preferably end portions of the ring 36, adjacent to the split 37, are turned forwardly to provide lugs 38 designed for engagement by a tool, for example a screw driver, to facilitate removal of the ring from the groove 31. The inner diameters of the rings 34 and 36 are preferably substantially the same as the diameter of the dial 16 so that when the rings 34 and 36 are in place, substantially all of the dial is exposed to view. Thus the entire surface of the dial is available for the reception of graduations or other indicia.

The transparent panel 20 which may be of glass or other suitable material is of a diameter preferably slightly less than the diameter of the surface 33a, but is of a diameter greater than the inner diameters of the rings 34 and 36. This transparent panel 20 is disposed against the ring 34, the latter being seated in the groove 30, and then the ring 36 is snapped into the groove 31 and its ends caused to abut, the slight distortion of the ring 36 in thus causing its ends to abut tending to cause the ring 36 to bear firmly against the transparent panel. By reason of the dished shape and resilient character of the ring 34, the latter bears at all times with spring pressure against the panel 20 so as to prevent the latter from rattling and also to compensate for panels of substantially different thickness. Since the edge of the transparent panel is disposed between the rings 34 and 36, it is wholly concealed and thus any slight roughness of such edge is immaterial. Moreover, if it be desired to associate gaskets with one or both of the rings 34 and 36, the overlap of the rings about the margin of the panel permits the introduction of such gaskets without detracting from the appearance of the instrument.

It may be noted by reference to Fig. 2 that the means for removably retaining the transparent panel in place is such as not to overlap the exterior surface of the case, nor even does it cover or require any alteration in the configuration of the forward edge 3 of the case and permits such forward edge portion to be quite thin. Thus the outer surface and the forward edge of the case may be given such shape and form as may be desired to insure a good appearance, without reference to the means for securing the transparent panel in position. Thus when, as herein illustrated, the outer surface of the case tapers forwardly with a smooth more or less conical surface terminating at the thin forward edge of the case, the case has a very pleasing appearance and seems smaller and less cumbersome than the usual gauge wherein the transparent panel is held in place by a bezel ring which covers the forward edge and overhangs the outer surface of the case.

While certain desirable embodiments of the invention have been illustrated by way of example, it is to be understood that the invention is not necessarily limited to these precise embodiments, but is to be regarded as broadly inclusive of any and all equivalent constructions falling within the scope of the appended claims.

We claim:

1. A gauge case of integral, one-piece moulded construction having an open front and which is of minimum external diameter at its front edge, said front edge of the case being thin and smoothly rounded, the case being of minimum external diameter at its forward edge portion and having therein a chamber for the reception of the gauge movement, a transparent panel of a diameter greater than the diameter of said chamber and less than the minimum external diameter of the case, the thin front portion of the wall of the case having an internal rabbet providing for disposal of the edge of the panel in a plane behind but closely adjacent to the plane of the front edge of the case, the wall of the rabbet having therein a peripheral groove provided with a radial front wall, said groove being disposed rearwardly of the front edge of the case, a split retaining ring of substantially rectangular transverse section seated in said groove and overlapping the front face of the transparent panel thereby removably to hold the panel in place, and resilient means urging the panel toward the rear face of said retaining ring.

2. A unitary gauge case of moulded material having an open front and which is of minimum external diameter at its front edge, said front edge of the case being thin and smoothly rounded, the case being of minimum external diameter at its forward edge portion and having therein a chamber for the reception of the gauge movement, a transparent panel of a diameter greater than the diameter of said chamber and less than the minimum external diameter of the case, the thin front portion of the wall of the case having an internal rabbet providing for disposal of the edge of the panel in a plane behind but closely adjacent to the plane of the front edge of the case, the wall of the rabbet having therein a peripheral groove provided with a radial front wall, said groove being disposed rearwardly of the front edge of the case, a resilient split ring of substantially rectangular transverse section seated within said groove and bearing against the front face of the panel, and resilient means disposed within said rabbet and rearwardly of the panel and constantly urging the panel forwardly toward said ring.

3. An instrument case designed to house a graduated dial, a pointer, means for actuating the pointer and a transparent panel for protecting the pointer and dial, the case having an internal circumferential rabbet forwardly of the plane of the dial, said rabbet having a peripheral wall of a diameter greater than that of the dial, said wall having therein spaced circumferential grooves, the front wall of the forward groove and the rear wall of the gear groove being radial surfaces, panel-positioning rings within said grooves, each of said rings being of substantially rectangular transverse section, each ring being operative by engagement with the marginal portion of the panel to retain the latter in position, said panel-positioning rings being wholly within the case and disposed rearwardly of the front edge of the case, at least one of the rings being constructed and arranged resiliently to urge the panel toward the other ring.

4. A gauge case having an open front, a transparent panel normally covering said front, the forward portion of the side wall of the case having a pair of spaced peripheral grooves in its inner surface, the forward groove at least having a radial front wall, the transparent panel having its edge disposed between said grooves, resiliently yieldable means seated in the rear groove and overlapping the rear surface of the panel and arranged constantly to urge the panel forwardly, and a retaining ring of substantially rectangular transverse section seated in the front groove and overlapping the front surface of the panel.

5. A gauge case having an open front, a transparent panel normally covering said front, the forward portion of the side wall of the case having a pair of spaced peripheral grooves in its inner surface, each groove having substantially radial front and rear walls, the transparent panel having its edge disposed between said grooves, a resiliently yieldable cushioning ring of substantially rectangular transverse section having its outer edge seated in the rear groove and having its inner portion contacting the rear surface of the panel, said ring being so constructed and arranged as constantly to urge the panel forwardly, and a retaining ring of substantially rectangular transverse section having its outer edge seated in the front groove and its inner portion overlapping the front surface of the panel.

6. An instrument case designed to house a graduated dial, a pointer, means for actuating the pointer, and a transparent panel, the forward portion of the side wall of the case having a pair of spaced circumferential grooves in its inner surface, the forward groove at least having a radial front wall, the transparent panel having its edge disposed between said grooves, a removable substantially rigid retaining ring of substantially rectangular transverse section having its outer edge seated within the front groove and having its inner margin bearing against the outer surface of the panel, said ring being split to facilitate its entry into the groove, the ends of the ring at the split normally abutting portions of the ring adjacent to said split being directed forwardly to facilitate its removal, and resilient means urging the panel into contact with said retaining ring.

7. An instrument case designed to house a graduated dial, a pointer, means for actuating the pointer, and a transparent panel, the forward portion of the side wall of the case having a pair of spaced circumferential grooves in its inner surface, the forward groove having a radial front wall and the rear groove having a radial rear wall, the transparent panel having its edge disposed between said grooves, a removable retaining ring having its outer edge normally seated in the front groove with its margin overlying the front surface of the panel, said ring being split thereby to permit it to be introduced into the groove, the ends of the ring at the split normally abutting, and a cushioning ring of substantially rectangular transverse section having its outer edge seated in the rear groove, said cushioning ring being crimped transversely whereby it presses resiliently against the rear surface of the panel at spaced points.

8. An instrument case designed to house a graduated dial, a pointer, means for actuating the pointer, and a transparent panel, the forward portion of the side wall of the case having a pair of spaced circumferential grooves in its inner surface, each of said grooves having substantially radial front and rear walls, the transparent panel having its edge disposed between said grooves, a resiliently yieldable cushioning ring of substantially rectangular transverse section having its outer edge seated in the rear groove and its inner margin contacting the rear surface of the panel, and a retaining ring of substantially rectangular transverse section having its outer edge seated in the front groove and its inner margin overlapping the outer surface of the panel, the inner diameter of each ring approximating that of the diameter of the dial.

FRANK H. HOPKINS.
CARL H. GRAESSER.